United States Patent
Shantharam et al.

(10) Patent No.: US 10,761,827 B2
(45) Date of Patent: Sep. 1, 2020

(54) WIN32 SOFTWARE DISTRIBUTION ARCHITECTURE

(71) Applicant: VMware, Inc., Palo Alto, CA (US)

(72) Inventors: Shravan Shantharam, Cumming, GA (US); Nigitha Alugubelli, Atlanta, GA (US); Blake Ryan Watts, St George, UT (US); Kalyan Regula, Alpharetta, GA (US); Jason Roszak, Brookhaven, GA (US); Nitin Radhakrishna Rao, Atlanta, GA (US); Sharath Chowdary Gude, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 37 days.

(21) Appl. No.: 15/365,216

(22) Filed: Nov. 30, 2016

(65) Prior Publication Data

US 2018/0150288 A1    May 31, 2018

(51) Int. Cl.
*G06F 9/44* (2018.01)
*G06F 8/65* (2018.01)
*H04L 29/08* (2006.01)
*G06F 9/455* (2018.01)
*G06F 8/61* (2018.01)

(52) U.S. Cl.
CPC ............ *G06F 8/65* (2013.01); *G06F 8/61* (2013.01); *G06F 9/45512* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 7,865,888 B1* | 1/2011 | Qureshi | .......... | G06N 5/048 717/168 |
| 8,335,851 B1* | 12/2012 | Vendrow | .......... | G06F 8/60 700/99 |
| 8,549,513 B2* | 10/2013 | Vinberg | .......... | G06F 8/61 717/174 |
| 2003/0051236 A1* | 3/2003 | Pace | .......... | G06F 8/60 717/177 |
| 2004/0143830 A1* | 7/2004 | Gupton | .......... | G06F 8/61 717/174 |
| 2004/0255291 A1* | 12/2004 | Sierer | .......... | G06F 8/61 717/174 |
| 2005/0027846 A1* | 2/2005 | Wolfe | .......... | G06F 8/61 709/223 |
| 2005/0262494 A1* | 11/2005 | Fung | .......... | G06F 8/656 717/170 |
| 2006/0179431 A1* | 8/2006 | Devanathan | .......... | G06F 8/61 717/168 |

(Continued)

*Primary Examiner* — Insun Kang
(74) *Attorney, Agent, or Firm* — Thomas | Horstemeyer, LLP

(57) ABSTRACT

Disclosed are various examples for an architecture to distribute Win32 applications. In one example, a specification of a Win32 application and deployment options are received. A specification of target client devices is also received. Respective management agents executed in individual target client devices are directed to install the Win32 application according to the deployment options. Status information from the respective management agents indicating installation success or failure is received. A report is generated based at least in part on the status information.

20 Claims, 5 Drawing Sheets

(56) References Cited

U.S. PATENT DOCUMENTS

| | | | |
|---|---|---|---|
| 2007/0169109 A1* | 7/2007 | Neswal | G06F 8/61 717/174 |
| 2007/0209034 A1* | 9/2007 | Doganata | G06F 9/505 717/174 |
| 2007/0220510 A1* | 9/2007 | Bell | G06F 9/453 717/174 |
| 2007/0240145 A1* | 10/2007 | Saroj | G06F 8/61 717/168 |
| 2008/0127179 A1* | 5/2008 | Moss | G06F 8/61 717/175 |
| 2009/0049443 A1* | 2/2009 | Powers | G06F 9/505 718/100 |
| 2010/0064226 A1* | 3/2010 | Stefaniak | G06F 9/5055 715/736 |
| 2013/0232463 A1* | 9/2013 | Nagaraja | G06F 8/61 717/101 |
| 2014/0053148 A1* | 2/2014 | Chan | G06F 8/41 717/174 |
| 2014/0082602 A1* | 3/2014 | Mallur | G06F 8/63 717/171 |
| 2014/0109078 A1* | 4/2014 | Lang | G06F 8/52 717/172 |
| 2014/0130036 A1* | 5/2014 | Gurikar | G06F 8/61 717/176 |
| 2015/0095975 A1* | 4/2015 | Barton | G06F 9/45533 726/1 |
| 2015/0121361 A1* | 4/2015 | Li | G06F 8/61 717/175 |
| 2015/0143333 A1* | 5/2015 | Gerber | G06F 8/70 717/120 |
| 2015/0271296 A1* | 9/2015 | Borzycki | G06F 21/6218 709/202 |
| 2016/0147518 A1* | 5/2016 | Dimitrakos | G06F 8/61 717/120 |
| 2016/0147522 A1* | 5/2016 | Dimitrakos | G06F 8/61 717/174 |
| 2016/0188310 A1* | 6/2016 | Hayami | G06F 21/608 717/174 |
| 2016/0301700 A1* | 10/2016 | Batson | H04L 67/10 |
| 2016/0378451 A1* | 12/2016 | Walker | G06F 8/52 717/111 |
| 2017/0060562 A1* | 3/2017 | Lopez | G06F 8/60 |
| 2017/0235570 A1* | 8/2017 | Catalano | G06F 8/77 717/101 |
| 2017/0250853 A1* | 8/2017 | Evans | G06F 21/53 |
| 2019/0230130 A1* | 7/2019 | Beckman | G06F 3/04817 |

* cited by examiner

WIN32 SOFTWARE DISTRIBUTION ARCHITECTURE

BACKGROUND

With the advent of mobile devices, software applications (or "apps") are frequently distributed as self-contained application packages that are easy to install and uninstall. For instance, applications for the ANDROID platform are distributed in the ANDROID Application Package (APK) format, while the WINDOWS 8.x and 10 platforms use the APPX and XAP formats, and the IOS platform uses the IOS App Store Package (IPA) format. Packages include metadata that enable a package manager to carry out package installation, upgrading, configuring, and uninstallation.

Older software applications for MICROSOFT WINDOWS are referred to as Win32 applications. These applications were developed for older application programming interfaces (APIs) used in WINDOWS prior to WINDOWS 8 and may still be supported in current versions of WINDOWS. Win32 applications predate the Universal Windows Platform (UWP) APIs, and thus are not deployed using the APPX or XAP package formats. These applications have frequently been distributed a variety of installation processes, including some with no formal installation process. For example, Win32 applications can be distributed as ZIP files, self-extracting executable (EXE) files, or MICROSOFT Installer (MSI) files.

With the plethora of different formats and different installation processes, managing Win32 applications within an organization can be troublesome for system administrators. Administrators who are familiar with mobile device management and mobile device package managers are likely to grow frustrated with the numerous issues relating to managing Win32 applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to an architecture for distributing Win32 software applications to client devices in a centralized, managed approach. A management application can provide unified interfaces for deploying and managing Win32 applications along with mobile applications. Various examples can assist in efficiently distributing large applications to end user client devices no matter whether a client device downloads an application from a remote location, or if a group of client devices in a single location attempts to install an application at the same time. As will be described, this architecture can enable uploading Win32 applications or downloading them from a repository, parsing application metadata, uploading dependencies, uploading application transforms, setting deployment criteria, installing applications, deploying application patches and cumulative updates, inventorying applications (including versions and patches), uninstalling applications and updates, and other features.

Figure 1:
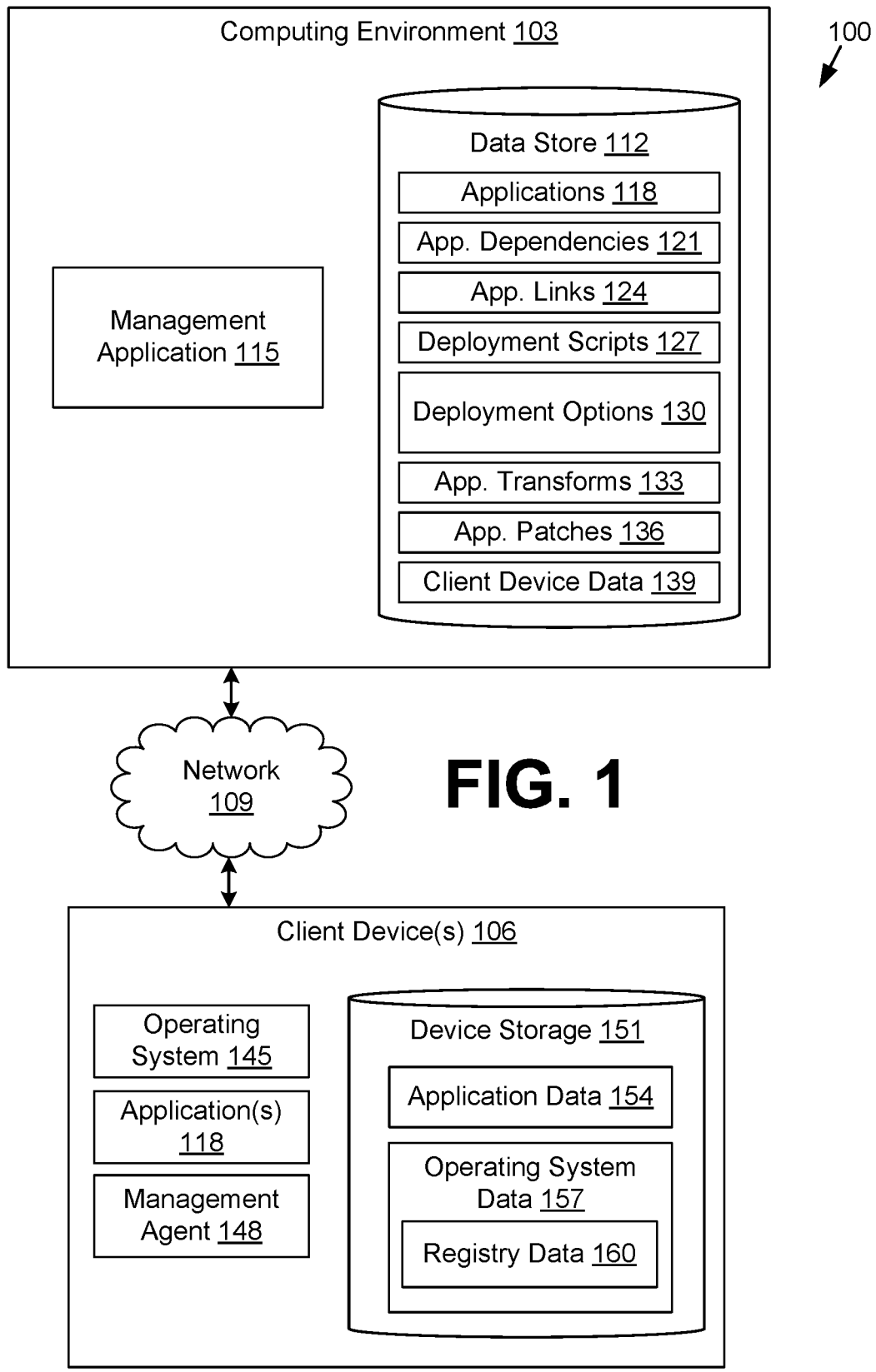
FIG. 1 is a drawing of a networked environment according to various examples of the disclosure.

With reference to FIG. 1, shown is a networked environment 100 according to various examples. The networked environment 100 includes a computing environment 103 and one or more client devices 106 in communication by way of network 109. The network 109 can include, for example, wide area networks (WANs), local area networks (LANs), wired networks, wireless networks, other suitable networks, or any combination of two or more networks. For example, the network 109 can include satellite networks, cable networks, Ethernet networks, and other types of networks.

The computing environment 103 can include, for example, a server computer, a network device, or any other system providing computing capabilities. Alternatively, the computing environment 103 can employ multiple computing devices that can be arranged, for example, in one or more server banks, computer banks, or other arrangements. The computing devices can be located in a single installation or can be distributed among many different geographical locations. For example, the computing environment 103 can include multiple computing devices that together form a hosted computing resource, a grid computing resource, or any other distributed computing arrangement.

In some cases, the computing environment 103 can operate as at least a portion of an elastic computing resource where the allotted capacity of processing, network, storage, or other computing-related resources can vary over time. The computing environment 103 can also include or be operated as one or more virtualized computer instances. Generally, the computing environment 103 can be operated in accordance with particular security protocols such that it is considered a trusted computing environment. The computing environment 103 can be located remotely with respect to the client device 106.

Various applications and/or other functionality may be executed in the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a management application 115 and other applications, services, processes, systems, engines, or functionality not discussed in detail herein. The management application 115 can manage or oversee the operation of multiple client devices 106. In some examples, an enterprise, such as one or more companies or other organizations, can operate the management application 115 to oversee or manage the operation of the client devices 106 of employees, contractors, or other users within an enterprise environment. In this sense, the client devices 106 can include managed devices that are managed by the management application 115.

In particular, the management application 115 can facilitate managed deployments of Win32 applications to one or more client devices 106 that execute MICROSOFT WINDOWS or other operating systems that support the Win32 APIs. To this end, the management application 115 can facilitate or oversee transfer of application data to the client devices 106, transfer of dependency data to the client devices 106, installation of the applications and dependencies, applying patches and updates to the applications and dependencies, and removal of the applications and dependencies. Also, the management application 115 can generate user interfaces for rendering by administrator client devices 106. These user interfaces can include network pages and/or other forms of network content, including hypertext markup language (HTML), JAVASCRIPT, extensible markup language (XML), and other content.

The data stored in the data store 112 includes, for example, applications 118, application dependencies 121, application links 124, deployment scripts 127, deployment options 130, application transforms 133, application patches 136, client device data 139, and potentially other data. The applications 118 can include Win32 applications and other applications that are deployed or are to be deployed to the client devices 106. The applications 118 are distributed as a zipped archive (e.g., ZIP, RAR, ARJ), a self-extracting executable (e.g., EXE), a MICROSOFT Installer file (e.g., MSI), or in other formats. The applications 118 can include executable files, data files, dynamic-link library (DLL) files, and other files, along with registry entries, installation target directories, and other configuration parameters.

The application dependencies 121 can include other applications 118, software libraries, data files, and system configurations upon which an application 118 depends. A given application 118 can have one or more application dependencies 121, and the application dependencies 118 can themselves have further application dependencies 121. Thus, the order of installation can be significant, so that nested application dependencies 121 are installed and configured first on a client device 106 before the application 118 is installed and configured.

The application links 124 are uniform resource locators (URLs) or other identifiers that provide links to applications 118 and/or application dependencies 121 that are available through an external content provider. In various examples, it can be advantageous to cause the client devices 106 to download the applications 118 and/or application dependencies 121 directly from the external content provider rather than through the data store 112.

The deployment scripts 127 can include executable scripts and/or commands to effect an installation or uninstallation of an application 118 and/or application dependencies 121. For example, a user can upload a file corresponding to a deployment script 127 with various commands in a scripting language. Alternatively, a user can specify one or more commands to be executed in an operating system command prompt. The deployment scripts 127 can carry out functions such as extracting compressed files, copying files, creating folders, deleting files and folders, adding or manipulating registry entries, and so forth.

The deployment options 130 configure options regarding deployment of applications 118 and application dependencies 121 to client devices 106. For example, deployment options 130 can specify criteria for when to install an application 118 (e.g., data contingencies, required disk space, required device power remaining, required memory, required processor availability, and so on). The deployment options 130 can also specify how to install the application 118 (e.g., install context (device or user), install commands, whether admin privileges are used, whether a device restart is not used, whether a device restart is forced, whether a device restart is used if necessary, a number of allowable installation retries upon failure of installation, an interval for waiting between installation attempts, and a timeout period after which an installation is considered failed). The deployment options 130 can also specify criteria that when met are used to determine whether an installation is considered complete. The deployment options 130 can also specify target client devices 106 and/or groups of client devices 106 upon which the application 118 is to be installed.

The application transforms 133 contain transformations or modifications to be applied to an application 118 or its corresponding configuration when installed on client devices 106. For example, an application transform 133 can customize an application 118 or enable or disable certain features of the application 118. Also, the application transforms 133 can be configured on a per-device or per-device-group basis. For example, an application transform 133 can enable administrative functionality of an application 118 for devices used by administrative users and disable administrative functionality of the application 118 for devices used by non-administrative users.

The application patches 136 can include patches and updates to an application 118 and/or application dependency 121 that correct security vulnerabilities, fix operational defects in the application 118 or application dependency 121, or provide updated functionality. The application patches 136 can be standalone or cumulative. For example, a cumulative patch can replace multiple standalone patches.

The client device data 139 includes a variety of data relating to the client devices 106 that are managed by the management application 115. For example, the client device data 139 can assign specific client devices 106 to specific groups based upon what user(s) are associated with the given client device 106. The client device data 139 can include security credentials and/or other information that enables the management application 115 to access the client devices 106 over the network 109 and to carry out management functionality.

The client device 106 is representative of a plurality of client devices 106 that may be coupled to the network 109. The client device 106 can comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 106 has an operating system 145 such as MICROSOFT WINDOWS, and the client device 106 is configured to execute various applications 118 such as Win32 applications and potentially other applications. The client device 106 is also configured with a management agent 148 that carries out the management functionality of the management application 115 and reports status information back to the management application 115 by way of the network 109.

The client device 106 has a device storage 151 with various data, including application data 154 and operating system data 157. The application data 154 includes the files, folders, and other data structures used by the applications 118. The operating system data 157 contains the system files, drivers, libraries, and/or other data used by the operating system 154. The operating system data 157 can include registry data 160 with system settings, device settings, applications settings, and so on.

Figure 2:
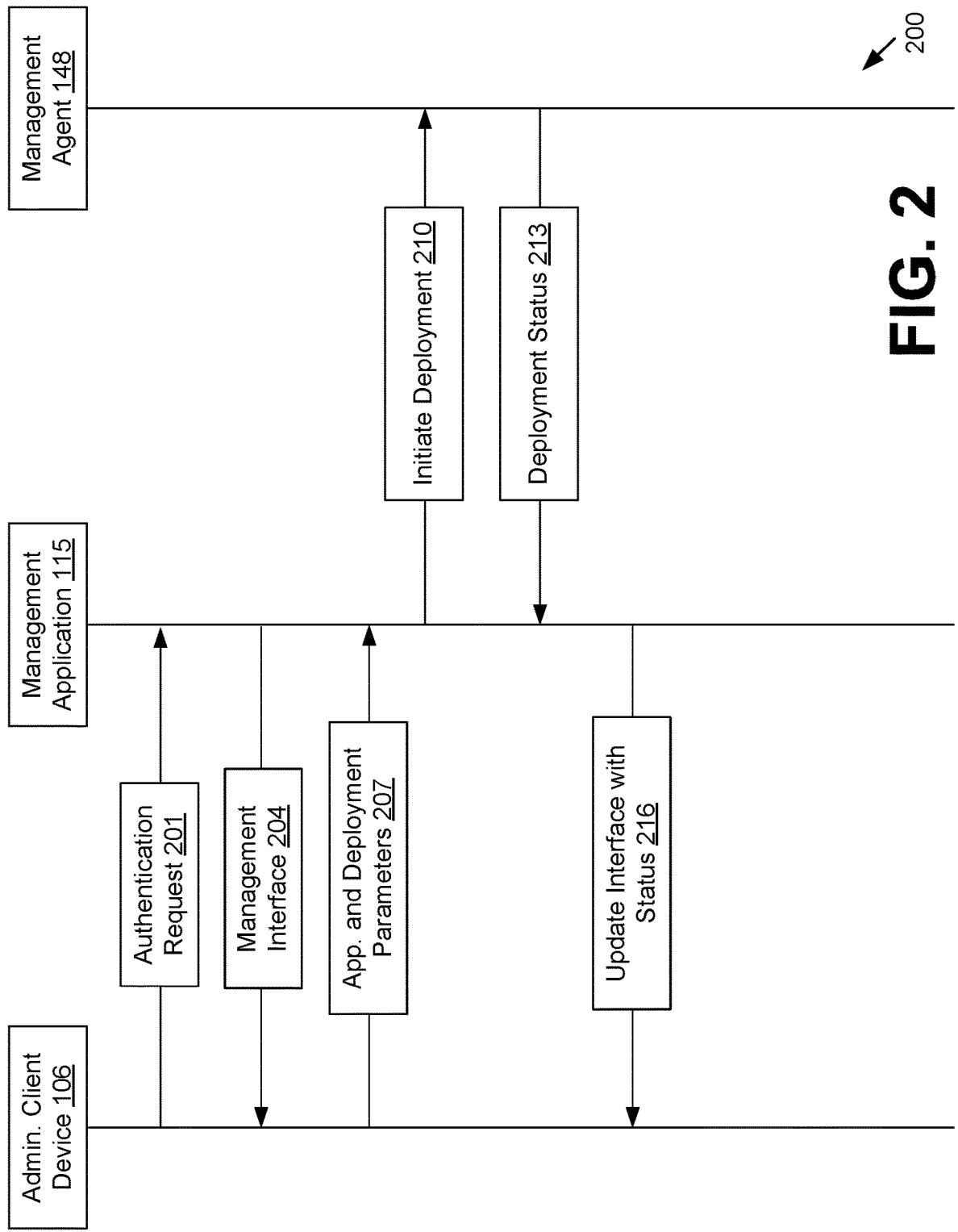
FIG. 2 is a sequence diagram illustrating example component interactions according to various examples of the present disclosure.

Moving on FIG. 2, shown is a sequence diagram 200 illustrating one example of interaction between an administrator client device 106, a management application 115, and a management agent 148. Functionality attributed to each of the administrator client device 106, the management application 115, and the management agent 148 can be implemented in fewer processes or application or in additional processes or applications. The separation or segmentation of functionality as discussed herein is presented for illustrative purposes only.

Beginning with step 201, a user at an administrator client device 106 causes an authentication request to be generated and sent by way of the network 109 to the management application 115 executed in the computing environment 103. For example, the user can load an application 118 that is customized for performing device management functions, or the user can use a browser application 118 to access a network site generated by the management application 115. The user can enter security credentials such as a username and password, or a registration credential or token can be sent to the management application 115 by way of a cookie or form parameter.

At step 204, the management application 115 verifies the credentials supplied in the authentication request and returns a management interface to the administrator client device 106 by way of the network 109. The management interface can correspond to one or more network pages or network content to be rendered as a user interface by way of the administrator client device 106. Through the management interface, or dashboard, the user can upload an application 118 and create or manage a deployment of the application 118.

At step 207, by way of the management interface rendered by the administrator client device 106, the user specifies an application 118 and deployment parameters for transfer to the management application 115. For example, the user can navigate serially through various form-based interfaces, specifying a variety of parameters relating to applications 118, application dependencies 121, application links 124, deployment scripts 127, deployment options 130, application transforms 133, and application patches 136.

At step 210, from the input provided by the administrator client device 106, the management application 115 initiates a deployment of the application 118 by way of communicating over the network 109 with management agents 148 executing on the respective client devices 106. The management agent(s) 148 proceed to commence the installation or modification process according to the established parameters. The deployment process can involve multiple installation attempts, and sequential installation of various application dependencies 121.

At step 213, the management agent 148 reports a status of the deployment to the management application 115. Such reporting can be performed periodically or in response to particular events. At step 216, the management application 115 causes the management interface to be updated with information regarding the deployment status.

Figure 3:
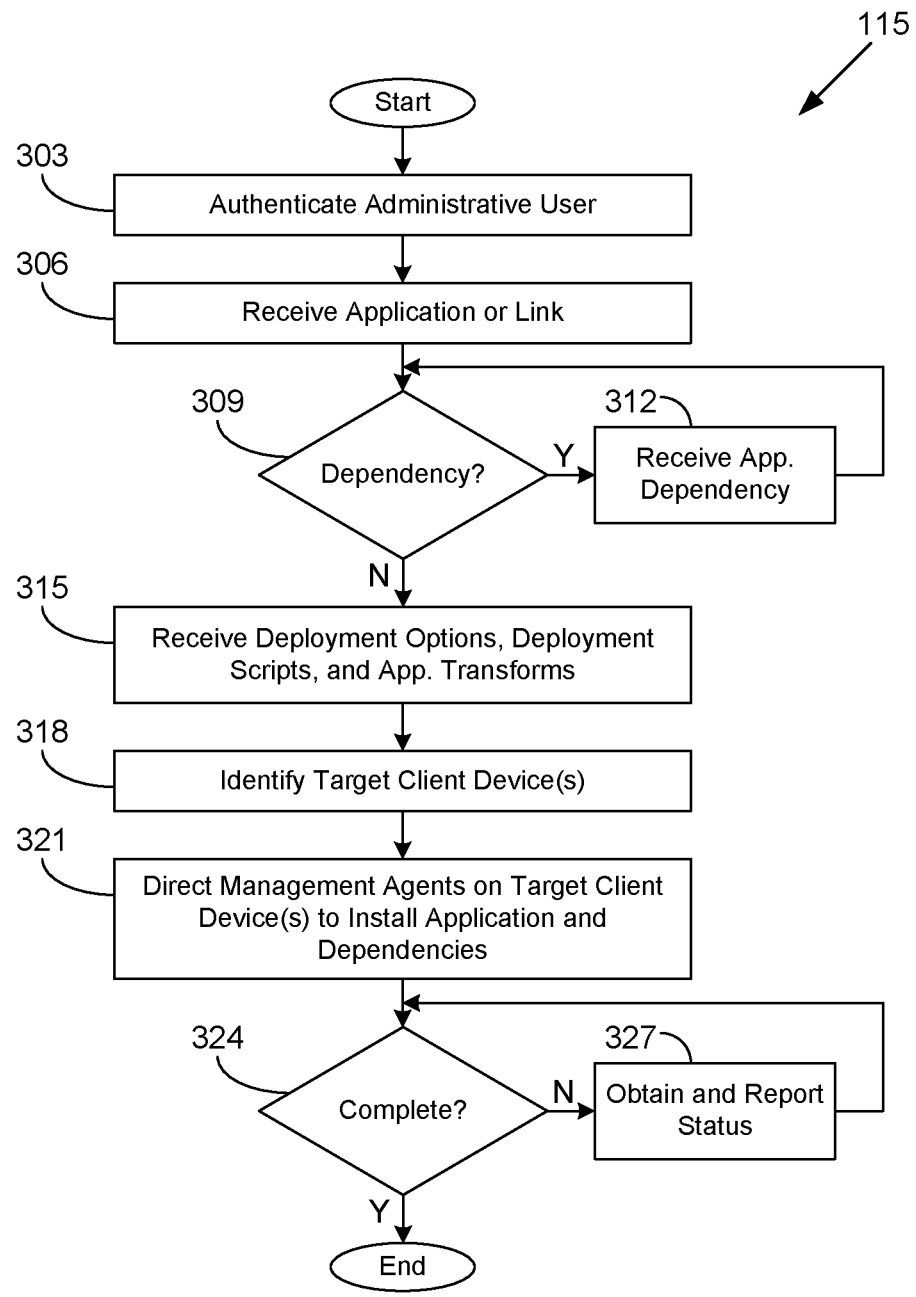
FIGS. 3-5 are flowcharts illustrating examples of functionality according to various examples of the present disclosure.

Turning now to FIG. 3, shown is a flowchart that provides one example of the operation of the management application 115. Functionality attributed to the management application 115 can be implemented in a single process or application or in multiple processes or applications. The separation or segmentation of functionality as discussed herein is presented for illustrative purposes only.

Beginning with step 303, the management application 115 authenticates an administrative user at an administrative client device 106. For example, the user can login with a token embedded in a cookie, a username and password, a secure certificate, or other forms of security credentials. At step 306, the management application 115 receives an application 118 or an application link 124 from the administrative client device 106. For example, a user can upload the application 118 directly, or the user can specify a URL or link to the application 118 in an external content repository.

At step 309, the management application 115 determines whether an application dependency 121 is to be provided. If an application dependency 121 is to be provided, the management application 115 continues to step 312 and receives the application dependency 121 or a link to an application dependency 121 from the administrator client device 106. The management application 115 can also receive sequencing information indicating when the application dependency 121 should be deployed relative to the application 118 and/or other application dependencies 121. After receiving an application dependency 121, the management application 115 can return to step 309 and determine whether additional application dependencies 121 are to be supplied. Otherwise, the management application 115 continues to step 315.

At step 315, the management application 115 receives deployment options 130, deployment scripts 127, application transforms 133, application patches 136, and/or other parameters or data used in deploying the application 118. These can be stored in the data store 112 in association with information about the application 118.

At step 318, the management application 115 identifies target client devices 106. For example, a user at an administrator client device 106 can specify particular client devices 106 or groups of client devices 106 to which an application 118 is to be deployed. At step 321, the management application 115 directs the management agents 148 executed by the target client devices 106 to install the application 118 and its associated application dependencies 121. This begins an asynchronous process of installation upon the client devices 106 as carried out by the management agents 148.

At step 324, the management application 115 determines whether the deployment is complete. If the deployment is not complete, the management application 115 obtains status information from the management agent 148 by way of a push or pull arrangement and then reports the status information by way of a user interface rendered upon the administrator client device 106. Alternatively, status notifications (e.g., text messages, emails, device notifications) can be sent over the network 109 to the administrator client device 106. Thereafter, the process can proceed to completion.

Figure 4:
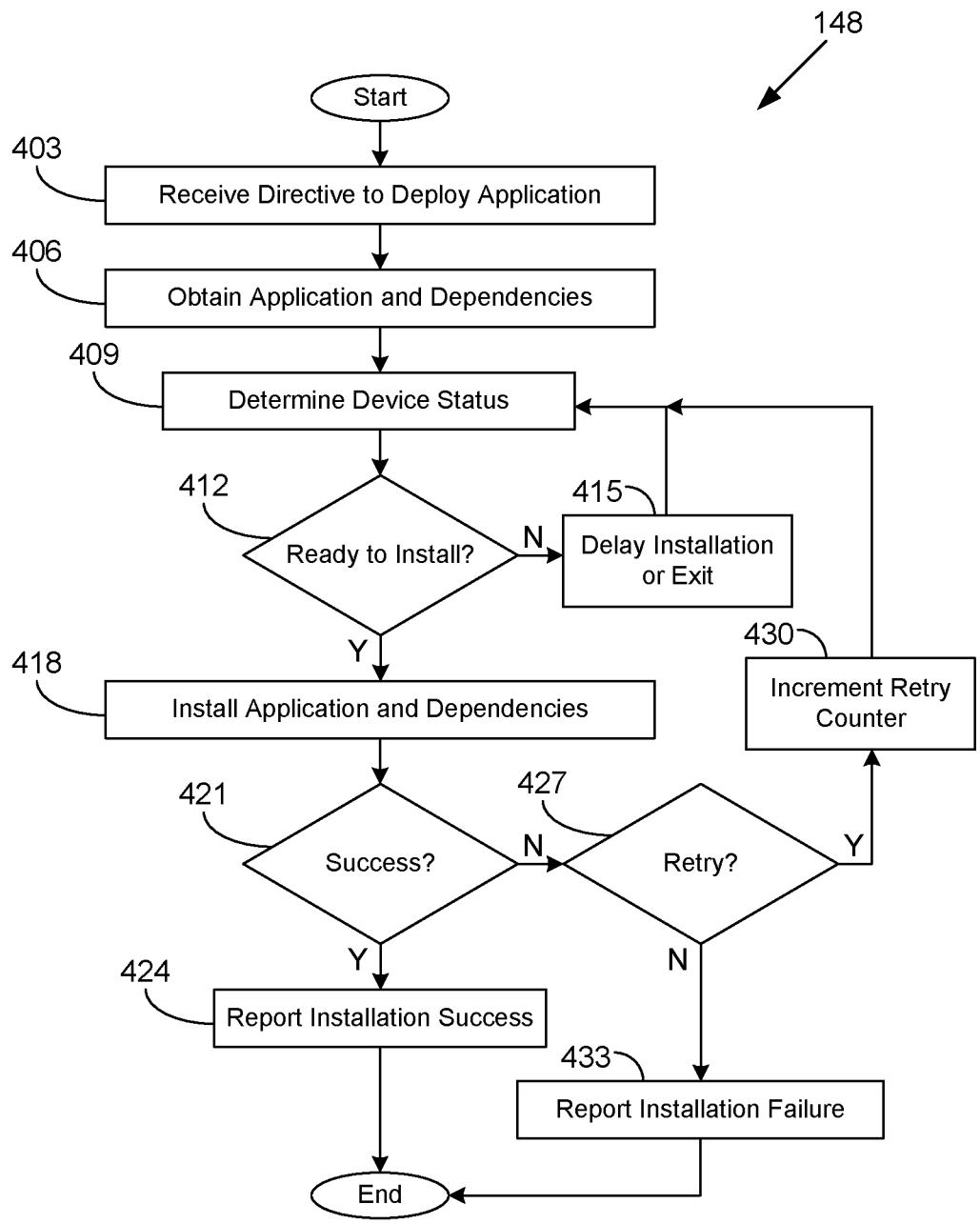

Continuing to FIG. 4, shown is a flowchart that provides one example of the operation of the management agent 148. Functionality attributed to the management agent 148 can be implemented in a single process or application or in multiple processes or applications. The separation or segmentation of functionality as discussed herein is presented for illustrative purposes only.

Beginning with step 403, the management agent 148 receives a directive to deploy an application 118 from a management application 115. At step 406, the management agent 148 obtains the application 118 and any application dependencies 121. In one example, the management agent 148 downloads, or receives an upload, from the data store 112 in the computing environment 103 over the network 109. In another example, the management agent 148 downloads the application 118 and any application dependencies 121 from an external content repository identified by an application link 124. In another example, the application 118 or one or more application dependencies 121 are already stored in the device storage 151. Also, in some cases, one or more application dependencies 121 are already installed on the client device 106, in which case installation of the respective application dependencies can be skipped.

At step 409, the management agent 148 determines parameters relating to the current status of the client device 106. These parameters can include, for example, a current processor utilization, a current amount of device storage 151 that is available, whether another installation process is currently executing, whether the client device 106 is currently being used by a user, a current version of the operating system 145, a current power level remaining for a power source of the client device 106, and so forth.

At step 412, the management agent 148 determines whether the application 118 and application dependencies 121 are ready to install. For example, the directive can specify certain criteria in the deployment options 130 that have to be met in order for the install to proceed. Thus, the management agent 148 can determine whether the current available power level exceeds a required available power level, whether a current available processor capacity exceeds a required available processor capacity, whether a current available amount of device storage 151 exceeds a required amount of available device storage, and so forth. Also, the deployment options 130 can delay the installation until a specified time of installation.

If installation is not ready to begin, at step 415, the management agent 148 can delay installation or exit. For example, if the application 118 or an application dependency 121 cannot be downloaded due to a file-not-found error, this can be considered a fatal error, and the management agent 148 can exit the installation, reporting the error to the management application 115. Otherwise, the installation can be delayed and retried later, and the management agent 148 can return to determining an updated device status in step 409.

At step 418, the management agent 148 invokes installation processes to install the application 118 and the application dependencies 121 according to a specified sequence, where the application dependencies 121 are installed prior to the application 118. If an application dependency 121 is itself dependent on another application dependency 121, the application dependency 121 upon which it is dependent is installed first.

At step 421, the management agent 148 determines whether the installation was successful. If the installation was successful, the management agent 148 continues to step 424 and reports the successful installation to the management application 115. Thereafter, the process proceeds to completion.

If the installation was not successful, the management agent 148 instead moves to step 427 and determines whether to retry the installation. For example, the management agent 148 compares a current retry counter to a retry limit, or a maximum number of installation retry attempts. If the installation is to be retried, the management agent 148 proceeds to step 430 and increments the retry counter. The management agent 148 then returns to step 409 and again determines the status of the client device 106 to begin another installation attempt.

If the installation is not to be retried (e.g., the retry counter exceeds the retry limit), the management agent 148 moves from step 427 to step 433. At step 433, the management agent 148 reports failure of the installation to the management application 115. The report can include the text of any errors or causes of the failure(s). Thereafter, the process proceeds to completion.

Figure 5:
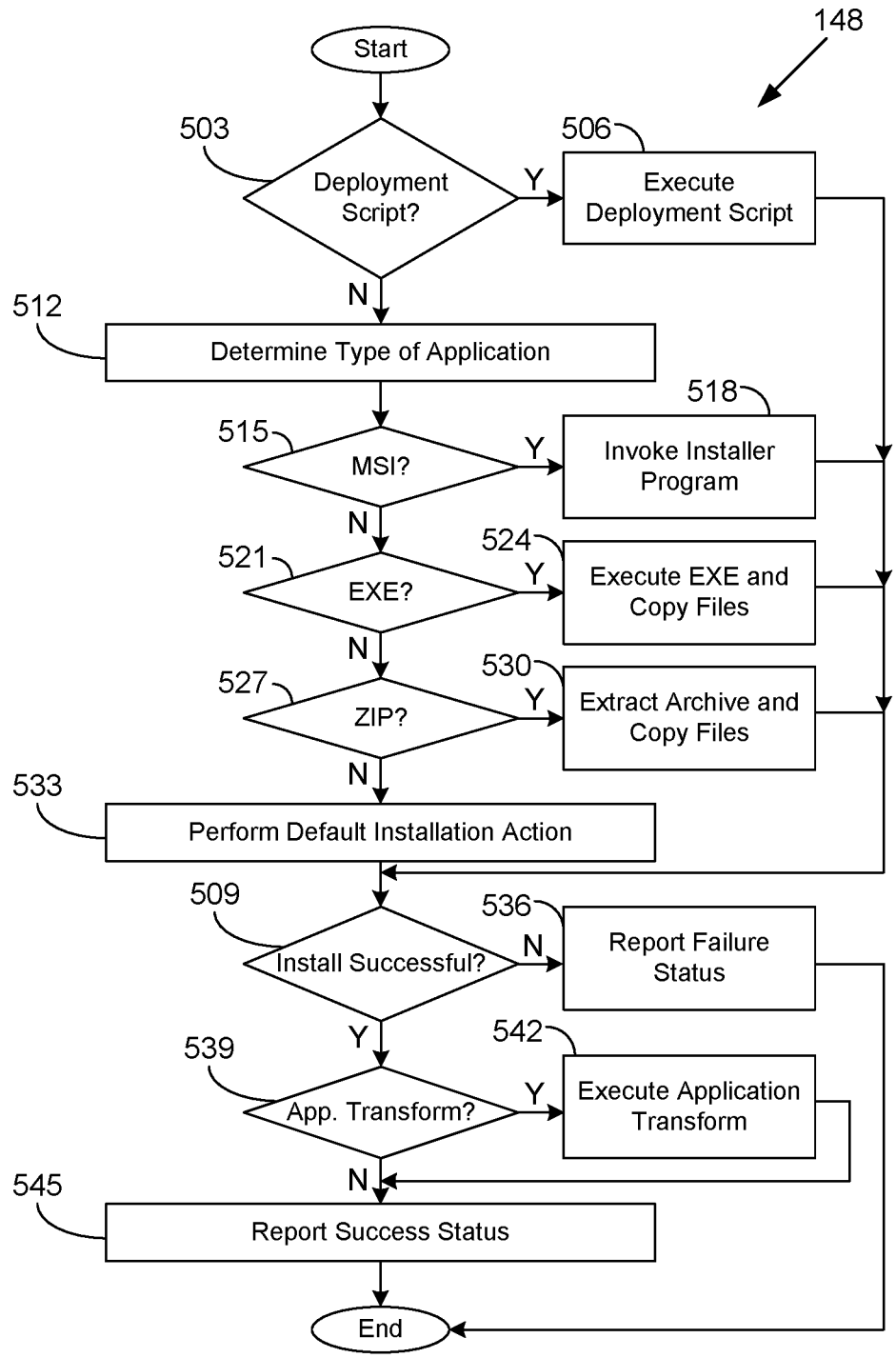

Referring next to FIG. 5, shown is a flowchart that provides one example of the operation of a portion of the management agent 148. In particular, the portion of the management agent 148 shown in FIG. 5 is an expansion of the tasks performed in step 418 of the flowchart of FIG. 4 to install an application 118 according to one or more examples. Functionality attributed to the management agent 148 can be implemented in a single process or application or in multiple processes or applications. The separation or segmentation of functionality as discussed herein is presented for illustrative purposes only.

Beginning with step 503, the management agent 148 determines whether a deployment script 127 has been provided by the management application 115. If a deployment script 127 has been provided, the management agent 148 executes the deployment script 127 at step 506 to effect the installation. The management agent 148 then continues to step 509.

If a deployment script 127 has not been provided, the management agent 148 instead moves to step 512 and determines the type of application 118 to be installed. This can be determined in various examples based on the file extension of the file of the application 118. At step 515, the management agent 148 determines whether the application 118 is in the MSI format. If the application 118 is in the MSI format, the management agent 148 invokes the installer program for the application 118 at step 518. The management agent 148 then proceeds to step 509.

If the application 118 is not an MSI application, the management agent 148 continues to box 521 and determines whether it is an executable application 118. If the application 118 is in an executable format, the management agent 148 executes the file to cause additional files to be extracted. The management agent 148 then copies the files to a destination folder of the device storage 151. The management agent 148 then proceeds to step 509.

If the application 118 is not a self-extracting executable application, the management agent 148 instead continues to step 527. At step 527, the management agent 148 determines whether the application 118 is distributed as a ZIP archive file. If so, the management agent 148 extracts the archive file and copies the files to a destination folder of the device storage 151 at step 530. Thereafter, the management agent 148 proceeds to step 509.

If the application 118 is not a ZIP archive file, the management agent 148 continues to box 533 and performs a default installation action. For example, the file can be a single executable (non-self-extracting) which can be copied to a destination folder. Thereafter, the management agent 148 proceeds to step 509.

At step 509, the management agent 148 determines whether the installation was successful. If the installation was not successful, the management agent 148 reports the failure status to the management application 115 at step 536. Thereafter, the process proceeds to completion.

If the installation was successful, the management agent 148 continues from step 509 to step 539. At step 539, the management agent 148 determines whether an application transform 133 has been specified for the application 118. If an application transform 133 has been specified, the management agent 148 executes the application transform 133 at step 542, thereby effecting a transformation to the application 118. The management agent 148 continues to step 545. The management agent 148 also continues to step 545 if no application transform 133 is specified.

At step 545, the management agent 148 reports the successful status of the installation along with any verbose output to the management application 115 by way of the network 109. Thereafter, the process proceeds to completion.

The flowcharts of FIGS. 3-5 and the sequence diagram of FIG. 2 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing environment 103 and the client devices 106 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the management application 115, the management agent 148, the operating system 145, the application 118, and/or other components can be stored in one or more storage devices and be executable by one or more processors. Also, a data store can be stored in the one or more storage devices.

The management application 115, the management agent 148, the operating system 145, the application 118, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying at least one program executable in at least one computing device of a management computing environment, the at least one program, when executed by the at least one computing device, being configured to cause the at least one computing device to at least:
   receive a first specification of a Win32 application, a plurality of deployment options, and an application transformation that enables or disables a functionality of the Win32 application;
   receive a second specification of a plurality of target client devices;
   direct, based on the first specification and the second specification, respective management agents executed in individual ones of the plurality of target client devices to determine an application type of the Win32 application to be installed on the plurality of target client devices based at least in part on a file extension of the Win32 Application, wherein the determination of the application type further comprises causing the at least one computing device to at least:
      determine if the application type is a Microsoft Installer (MSI) application,
      if the application type is not the MSI application, determine if the application type is a self-extracting executable (EXE) application,
      if the application type is not the self-extracting EXE application, determine if the application type is a zipped archive application;
   install the Win32 application according to the plurality of deployment options and the application type that is determined;
   receive status information from the respective management agents indicating installation success or failure of the Win32 application;
   execute the application transformation to enable or disable the functionality of the Win32 application based on the Win32 application being successfully installed; and
   generate a report based at least in part on the status information.

2. The non-transitory computer-readable medium of claim 1, wherein the first specification comprises an application dependency that specifies a second Win32 application upon which installation of the Win32 application depends; and wherein the application dependency causes the respective management agents to install the second Win32 application before the Win32 application.

3. The non-transitory computer-readable medium of claim 1, wherein a particular deployment option of the plurality of deployment options specifies a time at which the Win32 application should be installed.

4. The non-transitory computer-readable medium of claim 1, wherein a particular deployment option of the plurality of deployment options specifies an available device storage requirement.

5. The non-transitory computer-readable medium of claim 1, wherein a particular deployment option of the plurality of deployment options specifies a maximum number of installation retry attempts.

6. The non-transitory computer-readable medium of claim 1, wherein when executed the at least one program further causes the at least one computing device to at least:
receive the application transformation and a specification of a subset of the plurality of target client devices; and
direct a subset of the respective management agents corresponding to the subset of the plurality of target client devices to apply the application transformation to the Win32 application after installation.

7. The non-transitory computer-readable medium of claim 1, wherein the application transformation is configured on a per-device-group basis based on the deployment options.

8. The non-transitory computer-readable medium of claim 1, wherein in response to determining that the application type is associated with the MSI application, the respective management agents are configured to invoke an installer program to install the Win32 application.

9. The non-transitory computer-readable medium of claim 1, wherein in response to determining that the application type is the self-extracting EXE application, the respective management agents are configured to at least:
execute the Win32 application to extract a plurality of files; and
copy the plurality of files to an installation location.

10. The non-transitory computer-readable medium of claim 1, wherein in response to determining that the application type is the zipped archive application type, the respective management agents are configured to at least:
extract a plurality of files from the Win32 application; and
copy the plurality of files to an installation location.

11. A system, comprising:
at least one computing device; and
a management application executable by the at least one computing device, the management application configured to cause the at least one computing device to at least:
receive a first specification of a Win32 application, a plurality of deployment options, and an application transformation that enables or disables a functionality of the Win32 application;
receive a second specification of a plurality of target client devices;
direct, based on the first specification and the second specification, respective management agents executed in individual ones of the plurality of target client devices to determine an application type of the Win32 application to be installed on the plurality of target client devices based at least in part on a file extension of the Win32 Application, wherein the determination of the application type further comprises causing the at least one computing device to at least:
determine if the application type is a Microsoft Installer (MSI) application,
if the application type is not the MSI application, determine if the application type is a self-extracting executable (EXE) application,
if the application type is not the self-extracting EXE application, determine if the application type is a zipped archive application;
install the Win32 application according to the plurality of deployment options and the application type that is determined;
receive status information from the respective management agents indicating installation success or failure of the Win32 application;
execute the application transformation to enable or disable the functionality of the Win32 application based on the Win32 application being successfully installed; and
generate a report based at least in part on the status information.

12. The system of claim 11, wherein when executed the management application is further configured to cause the at least one computing device to at least:
receive a deployment script; and
send the deployment script to the respective management agents, wherein the respective management agents are configured to execute the deployment script to install the Win32 application.

13. The system of claim 11, wherein the application transformation is configured on a per-device-group basis based on the deployment options.

14. The system of claim 11, wherein the specification comprises an application dependency that specifies a second Win32 application upon which installation of the Win32 application depends; and wherein the application dependency causes the respective management agents to install the second Win32 application before the Win32 application.

15. The system of claim 11, wherein when executed the management application is further configured to cause the at least one computing device to at least:
receive the application transformation and a specification of a subset of the plurality of target client devices; and
direct a subset of the respective management agents corresponding to the subset of the plurality of target client devices to apply the application transformation to the Win32 application after installation.

16. A method, comprising:
receiving a first specification of a Win32 application, a plurality of deployment options, and an application transformation that enables or disables a functionality of the Win32 application;
receiving a second specification of a plurality of target client devices;
directing, based on the first specification and the second specification, respective management agents executed in individual ones of the plurality of target client devices to determine an application type of the Win32 application to be installed on the plurality of target client devices based at least in part on a file extension of the Win32 Application, wherein determination of the application type further comprises:
determine if the application type is a Microsoft Installer (MSI) application,
if the application type is not the MSI application, determine if the application type is a self-extracting executable (EXE) application, if the application type is not the self-extracting EXE application, determine if the application type is a zipped archive application;

installing the Win32 application according to the plurality of deployment options and the application type that is determined;

receiving status information from the respective management agents indicating installation success or failure of the Win32 application;

executing the application transformation to enable or disable the functionality of the Win32 application based on the Win32 application being successfully installed; and generating a report based at least in part on the status information.

17. The method of claim 16, further comprising:

receiving an application transformation and a third specification of a subset of the plurality of target client devices; and directing a subset of the respective management agents corresponding to the subset of the plurality of target client devices to apply the application transformation to the Win32 application after installation.

18. The method of claim 16, wherein the specification comprises an application dependency that specifies a second Win32 application upon which installation of the Win32 application depends; and wherein the application dependency causes the respective management agents to install the second Win32 application before the Win32 application.

19. The method of claim 16, wherein a particular deployment option of the plurality of deployment options specifies a processor utilization requirement.

20. The method of claim 18, further comprising:

receiving, through a management interface, a specification of a Uniform Resource Link (URL) to the application dependency.

\* \* \* \* \*